United States Patent [19]

Massarksy

[11] Patent Number: 6,141,482

[45] Date of Patent: Oct. 31, 2000

[54] METHOD FOR SAVING, ACCESSING AND REPRINTING A DIGITIZED PHOTOGRAPHIC IMAGE

[75] Inventor: Yefim Massarksy, Newton, Mass.

[73] Assignee: Foto Fantasy, Inc., Windham, N.H.

[21] Appl. No.: 08/969,976

[22] Filed: Nov. 13, 1997

[51] Int. Cl.[7] .............................. H04N 5/765; H04N 5/77
[52] U.S. Cl. .............................................. 386/46; 386/118
[58] Field of Search .............................. 386/46, 107, 117, 386/121, 125, 126, 52, 1, 38, 118; 360/32, 13; 348/207, 208, 222; H04N 5/765, 5/77

[56] References Cited

U.S. PATENT DOCUMENTS

| | | |
|---|---|---|
| 4,687,526 | 8/1987 | Wilfert . |
| 5,109,281 | 4/1992 | Kobori et al. . |
| 5,153,730 | 10/1992 | Nagasaki et al. ........................ 386/117 |
| 5,343,386 | 8/1994 | Barber . |
| 5,500,700 | 3/1996 | Massarsky ................. 354/76 |
| 5,768,633 | 6/1998 | Allen et al. .................. 396/2 |
| 5,841,886 | 11/1998 | Rhoads ...................................... 382/115 |

*Primary Examiner*—Robert Chevalier
*Attorney, Agent, or Firm*—Brian M. Dingman

[57] ABSTRACT

A method for saving, accessing and reprinting a digitized photographic image of a user at a photography booth comprising the steps of: generating a code corresponding to the digitized photographic image; printing a first hard copy of the digital photographic image so that the code appears either on the first hard copy, on a separate receipt or on the photo booth itself; saving the digitized photographic image as the set of digital information under the code onto a first computer readable means capable of storing digital information; accessing the digitized photographic image comprising the steps of, entering the code, as it appears on the hard copy, receipt or photography booth, into a means for accessing the set of digital information from the first computer readable means capable of storing digital information, retrieving the saved digitized photographic image, and printing a second hard copy of the digitized photographic image in various alternative print formats.

16 Claims, 8 Drawing Sheets

METHOD FOR SAVING, ACCESSING AND REPRINTING A DIGITIZED PHOTOGRAPHIC IMAGE

FIELD OF THE INVENTION

This invention relates to a method for saving, accessing and reprinting a digitized photographic image that is particularly adapted for use with a self-photography booth or kiosk.

BACKGROUND OF THE INVENTION

Self-photography booths have been used for years. The traditional booths included a camera that was actuated once the user inserted the correct amount of money. A time mechanism was employed to take a specific number of flash pictures of the occupant or occupants of the booth.

With the advent of computer and video technology, the booths have been modernized. Video cameras allow a live image of the user to be taken. Video processing of the image then allows a photograph to be generated from that live image. None of the devices, however, allow the user to purchase subsequent copies of the printed image after the initial transaction is complete. Furthermore, none of these devices allows the user to purchase alternative print formats of the image such as reduced or enlarged prints, or prints on posters, t-shirts, mugs, pins, hats, screen savers, etc., using the original digital information. To obtain any such alternative print formats using the prior art devices, the original photograph must be scanned and then reproduced which further reduces the quality of the image. In addition, the income generated by the self-photography booth is limited to the income derived from producing a single set of original prints.

SUMMARY OF THE INVENTION

It is therefore an object of this invention to provide a method for saving, accessing and reprinting an unlimited number of original prints of a digitized photographic image.

It is a further object of this invention to provide such a method which generates more income.

It is a further object of this invention to provide such a method which allows the user to view the first original print and subsequently purchase additional original prints.

It is a further object of this invention to provide such a method which allows the user to view the first original print and subsequently purchase alternative print forms using the original digitized photographic information.

This invention results from efforts to provide users of self-photography booths with a method for purchasing additional original prints of an image, or alternative print forms, having the same quality as the original print, after the original print is delivered to the user at the booth. These efforts were also intended to create opportunities for the owner of the self-photography booths to generate additional income from use of the booths after the first original print is delivered to the user at the booth. In effect, the invention relates to an indexed database of digital negatives. The database is then used to support insertion, deletion and retrieval of digitized photographic images taken at one or more photo booths.

This invention features a method for saving, accessing and reprinting a digitized photographic image in alternative hard copy forms wherein a means capable of processing a digitized image is provided and wherein the digitized photographic image comprising a set of digital information is provided. The preferred embodiment comprises the steps of: generating a code corresponding to the digitized photographic image; printing a first hard copy of the digital photographic image so that the code appears on the first hard copy; saving the digitized photographic image as the set of digital information under the code onto a first computer readable means capable of storing digital information; accessing the digitized photographic image comprising the steps of, entering the code, as it appears on the hard copy, into a means for accessing the set of digital information from the first computer readable means capable of storing digital information, retrieving the saved digitized photographic image, and printing a second hard copy of the digitized photographic image. The means for accessing may be provided within the same device as the means capable of processing a digitized image or the means for accessing may be a separate device located proximate to, or remotely from, the means capable of processing. The means for accessing may be separate yet able to interface with the means capable of processing using analog and/or digital lines including but not limited to laplink, modem, TS or ISDN lines.

The code may comprise a barcode, in which case the step of entering the code may comprise exposing the barcode to a means for reading barcodes. Alternatively the code may comprise a numerical and/or an alphabetical code which can be deciphered by a person and entered manually in whole or in part by hand into the means for accessing the set of digital information from the first computer readable means capable of storing digital information.

As mentioned above, the means for accessing may be separate from the means capable of processing. If separate, the invention will further include the step of transferring the set of digital information from the means capable of processing a digitized image to the means for accessing the set of digital information. The transferring step may take alternate forms including physically transferring the first computer readable means for storing, or portable storage media, from the means for processing to the means for accessing wherein the computer readable means may comprise a zip drive, diskette and/or CD ROM; electronically transferring the digital information from the means for processing to the means for accessing using a laplink or modem; or by electronically transferring the set of digital information from the first computer readable means to a second computer readable means capable of storing digital information. In the latter configuration, the means for accessing the set of digital information must be capable of accessing the digital information from the second computer readable means of storing digital information. The transferring step preferably takes place after the saving step and before the accessing step.

The first computer readable means capable of storing digital information may comprise the first computer's hard drive, a zip drive, a diskette and/or the hard drive of a second computer capable of interfacing with the first computer via a laplink or modem. The second computer readable means capable of storing digital information may comprise a zip drive, a diskette, a CD ROM and/or the hard drive of a second computer.

As noted above, the means for accessing the set of digital information from the first computer readable means capable of storing digital information may directly interface with the means capable of processing a digitized image through a modem, laplink or other suitable means for direct communication, or may be separate from and unable to directly interface or communicate with the means capable of processing a digital image. In the former instances, the transferring step may comprise the step of interfacing the means capable of processing a digital image with the means for accessing the set of digital information.

Another preferred embodiment of the method of the invention comprises the steps of: generating a code corresponding to the digitized photographic image; printing a first hard copy of the digitized photographic image; saving the digitized photographic image as the set of digital information under the code onto a first computer readable means capable of storing digital information; accessing the digitized photographic image comprising the steps of, entering the code into a means for accessing the set of digital information from the first computer readable means capable of storing digital information, retrieving the saved digitized photographic image, and printing a second hard copy of the digitized photographic image. This embodiment may further including a step of delivering the first hard copy of the digitized photographic image to the user contemporaneously with the code. The delivering step may include printing the code on a receipt and delivering the receipt to the user at the booth. Alternatively the delivering step may be accomplished by displaying the code on a monitor provided at the photography booth.

BRIEF DESCRIPTION OF THE DRAWINGS

Other objects, features and advantages will occur to those skilled in the art from the following description of preferred embodiments and the accompanying drawings, in which.

DESCRIPTION OF PREFERRED EMBODIMENTS

Figure 1:
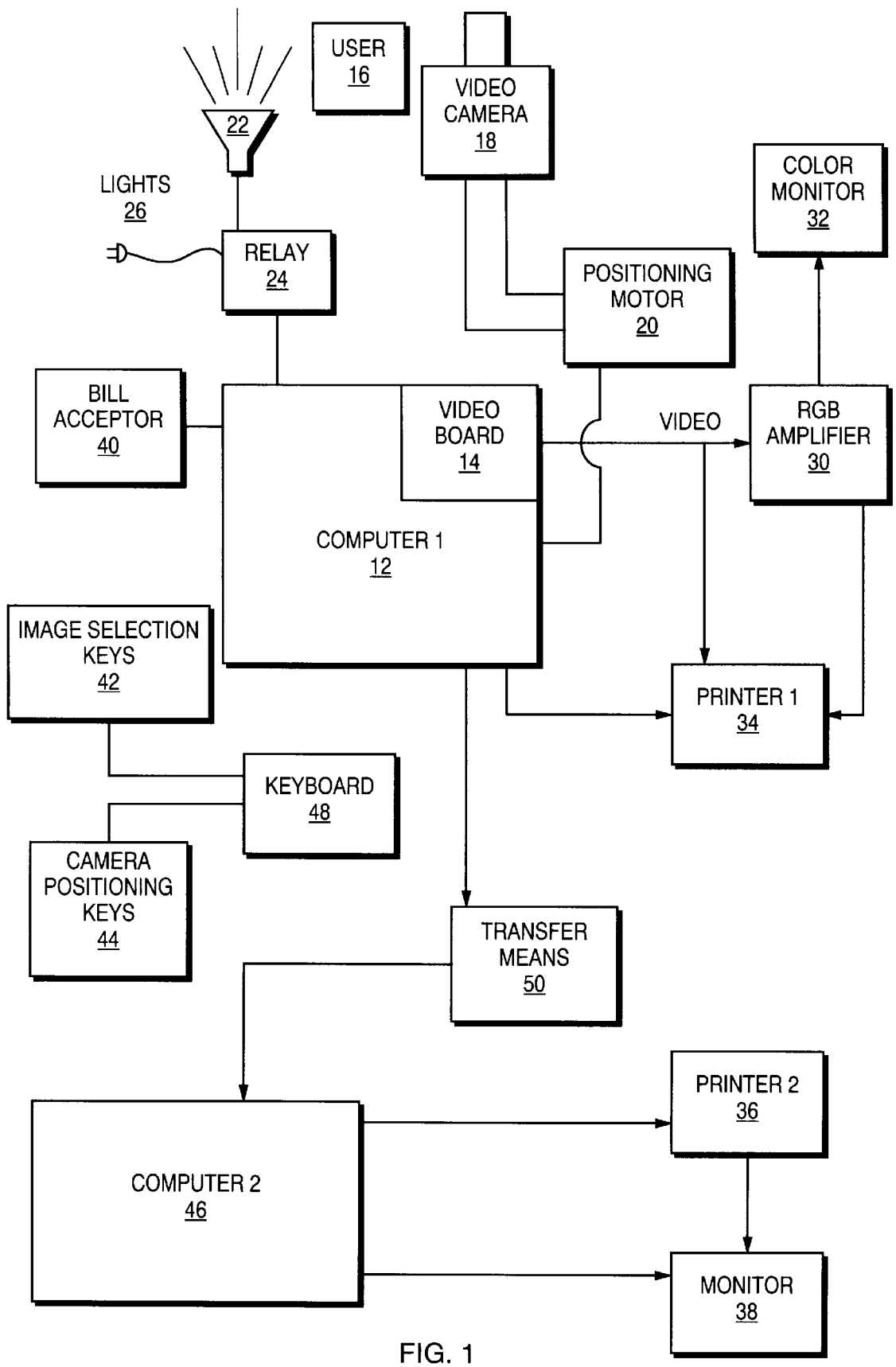
FIG. 1 is a schematic block diagram of the system for accomplishing the preferred embodiment of the invention.

This invention generally relates to a self-photography booth which enables a user of such a photo booth to purchase additional copies or alternative print formats of the photograph after the user has completed the initial transaction and has received the actual photograph/s of him or herself taken at the photo booth. It is envisioned that a user of the photo booth of this invention will purchase a photo, on which appears a code, unique to, and corresponding to, the user's photograph, and a telephone number or e-mail address for ordering additional copies and/or a catalog of alternative print formats. The code and telephone number or e-mail address may also be delivered to the user on a separate receipt or visually on a monitor provided at the photo booth. At some later time determined by the user, the user has the option to order additional photographs or alternative print forms by simply calling the telephone number or e-mail address printed on the user's photograph or receipt and providing the order taker with the code printed on the user's photograph. The order taker then accesses the information from a general database of codes previously generated and saved on, a zip drive, hard drive, CD ROM or other suitable means for storing digital date, contemporaneously with and corresponding to the original photograph delivered to the user at the booth, and then later transferred and entered on a regular basis into the general database of codes. In essence, the user of this self-photography booth is provided with more than the original photograph taken at the booth, the user walks away with a "negative" from which other copies, having the same picture quality as the original, can be produced.

More specifically this invention features several methods for saving, accessing and reprinting a digitized photographic image. These methods are particularly suited for use with self-photography booths capable of digitizing a photographic image. Generally the methods include the steps of providing a digitized photographic image, processing the digitized photographic image with a computer capable of processing such digital information, generating a code corresponding to the digitized photographic image, printing a first hard copy of the digital photographic image so that the code appears on the hard copy, saving the digitized photographic image as the set of digital information under the code onto a portable storage media including but not limited to zip drives, diskettes or CD ROMs, removing the digital information from the computer, transferring the digital information from the storage device to a second computer located some distance from the self-photography booth, accessing the digitized photographic image based on the code at the user's request by retrieving the digitized photographic image from the second computer's memory or storage device, and printing one or more original copies of the digitized photographic image. Instructions and code for obtaining additional prints or alternative print media may be printed on the front or back of the original print and/or separate receipt delivered to the user at the booth or displayed at the booth on a monitor.

There is shown in FIG. 1 system 10 for accomplishing a preferred embodiment of the invention. System 10 includes personal computer 12 with video grabber board 14 such as a Flashpoint by Integral Technologies. Computer 12 also includes memory such as a hard drive, a diskette or a zip drive, not shown. Video camera 18 is positioned to capture a portrait image or bust of user 16. The vertical and lateral position of video camera 18 may be changed by including a positioning motor 20 that is operated by the user using camera position keys 44. Lights 22 are preferably lit only when the device is in use. This may be accomplished by including relay 24 between power source 26 and light 22 which is energized by computer 12 on sensing by bill acceptor 40 of sufficient money to begin use of the device. For example, the user may be allowed five minutes of use for $1.00. During that time the user uses image selection keys 42 to select from a number of stored background images that are displayed on monitor 32. Also displayed on monitor 32 is the image of the user captured by video camera 18. The images are superimposed in a standard manner by video board 14. The output of video board 14 is a RGB output that is amplified by amplifier 30 and provided to monitor 32 as well as printer 34. Printer 34 is capable of printing a photograph from a video image and is enabled through computer 12 upon the user's request.

The system further includes a second computer 46 which may or may not be configured to interface directly with computer 12 through transfer means 50. If computer 46 is configured to interface directly, then transfer means 50 may comprise an analog and/or digital line including but not limited to laplink, modem, TS or ISDN lines. If computer 46 is electronically remote from computer 12, then transfer means may comprise a portable storage media including but not limited to zip drives, diskettes and/or CD ROMs which can be physically transferred from computer 12 to computer 46. Printer 36 is also capable of printing a photograph of a video image and is enabled through computer 46. The composite image accessed by computer 46 may be displayed on external video monitor 38 which is capable of displaying a digitized image.

The system typically includes keyboard 48 and DOS monitor 50 that are accessible only by the owner or operator of the booth, for example, held behind a locked door. In this case, keys 42 and 44 may be hardwired directly to different keys of traditional keyboard 48 so that computer 12 can be programmed to accomplish the desired function on sensing of the correct keystroke.

Figure 2:
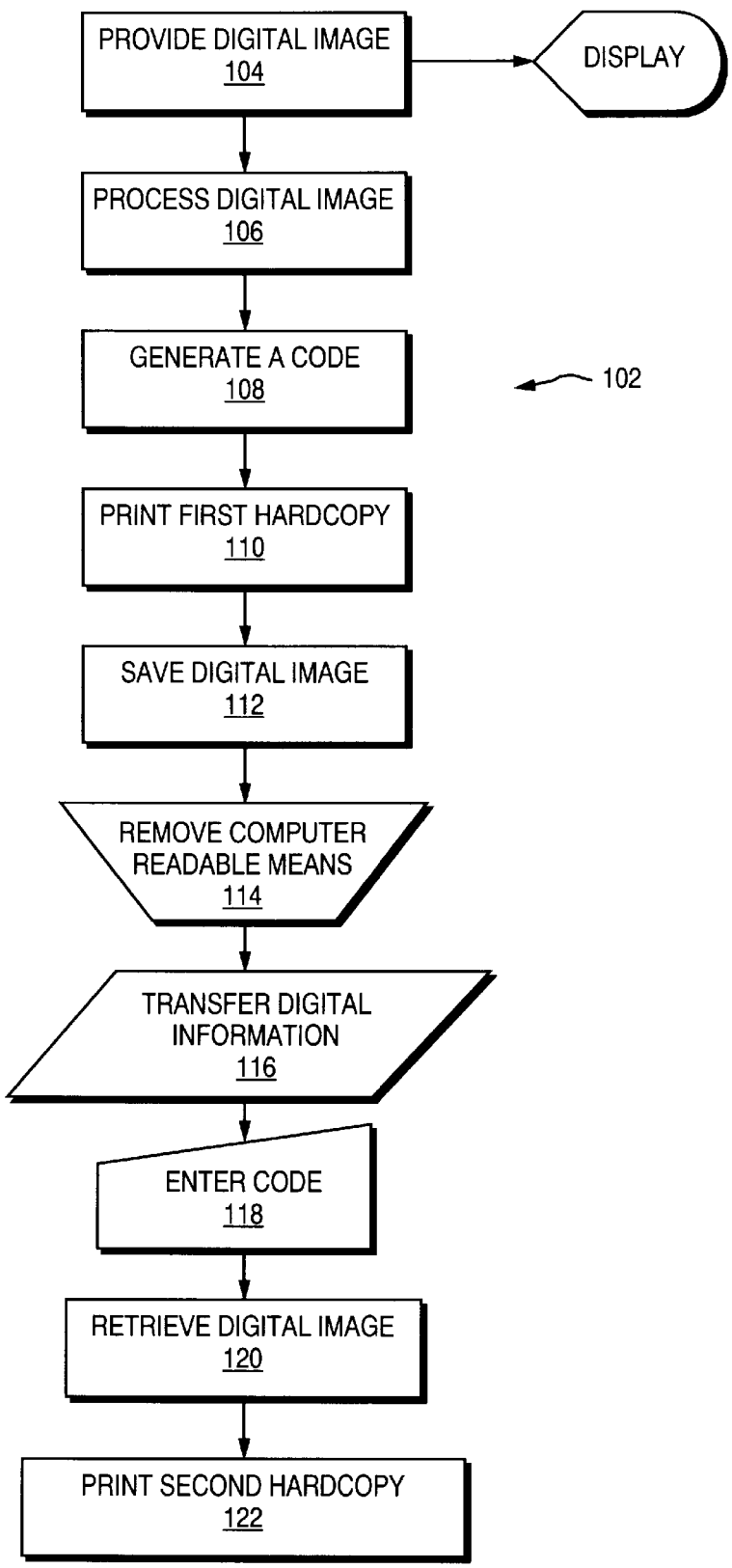
FIG. 2 is a flow chart of a preferred embodiment of the invention.

A flow chart of one method according to this invention which uses the system of FIG. 1, wherein computer 46 is electronically separate from computer 12, is shown in FIG. 2. Method 102 shown in FIG. 2 begins with step 104 in which a digital image of the user positioned in front of booth 100 is obtained initially through video camera 18. The digital image from video camera 18 is processed by computer 12 in step 106 into a set of digital information. A unique code corresponding to the user's photographic image is generated by computer 12 in step 108. In response to the user's command a first hardcopy of the digital image is printed and delivered to the user in step 110 while at booth 100. Both the code and complete instructions for obtaining additional original copies and/or alternative forms of print media are preferably printed on the front or back of the first hardcopy of the digital image delivered to the user at booth 100. Alternatively, the code and/or instructions may be printed on a separate receipt which is delivered to the user at the booth or may be displayed on monitor 32.

The code effectively identifies each photographic image from all other photographic images. The codes may consist of bar codes as these are commonly known in the art or alphanumerical codes. For example, the code may comprise a twelve digit code such as 10289675.425 wherein the first six digits represent the date the photograph was taken, Oct. 28, 1996; the next two digits represent the sequential position of the photograph among all photographs taken on that day, namely, the 75th photograph saved on Oct. 28, 1996; and the last three digits represent the specific photobooth at which the photograph was taken. In summary, this code indicates that the photograph was the 75th photograph taken by photobooth #425 on Oct. 28, 1996.

The digital image may be saved in step 112, before, after or simultaneously to, step 110, as a set of digital information under the previously generated code, on a transfer means 50 which comprises a means for storing digital information. This means for storing digital information may be any computer readable device capable of storing digital information and capable of being physically removed, but preferably comprises a zip drive and/or diskette. The means for storing digital information should be capable of storing a practical number of digital images. For example, a zip drive typically can hold up to about 200 digital images before its memory is full. This capacity may be increased by compressing the images.

If transfer means 50 comprises a zip drive or diskette, the zip drive or diskette is subsequently removed from booth 100 in step 114. The digital information, by way of the zip drive or diskette, is then transferred to electronically remote computer 46.

The digital information may initially be stored on computer 12's hard drive, in which case removal may be accomplished by downloading the digital information from computer 12's hard drive directly onto transfer means 50 which may comprise a diskette or zip drive and then transferred to computer 46.

The database of all the collected digitized photographs may be permanently stored on computer 46's hard drive or on a zip drive to the extent of the hard drive's or zip drive's memory capacity or may be appropriately cataloged and stored using any number of other means for storing digital data including, but not limited to, diskettes or CD ROMS.

One or more methods for ordering additional original prints or obtaining a catalog of other types of available print media may be included with the instructions which appear on the first hardcopy of the digital image and/or on the face of booth 100. These methods include, but are not limited to, mail order catalogs, by telephone, e-mail, website, swiping the bar code provided on the first hardcopy over a sensor provided at or proximate to the self-photography booth, manually entering a numerical and/or alphabetical code provided on the first hardcopy into a keyboard provided at or proximate to the self-photography booth, and/or presenting the first hardcopy to an appropriately identified vendor located near to, or remote from, the self-photography booth. Prompts may be displayed on color monitor 32 to aid the user in requesting that additional prints and/or a catalog of products be sent to an address provided by the user. The above described first means for storing the digital information may also include such ordering information as provided by the user at the self-photography booth.

Alternative print formats include any tangible object capable of retaining an image thereon, including, but not limited to, reduced or enlarged prints, framed prints, prints downloaded from a website or prints on posters, t-shirts, mugs, pins, hats, keychains, stickers, magnets or screen savers.

Upon initiation of the user, the code appearing on the first hardcopy is either electronically or manually entered, in step 118, into second computer 46. If a bar code is provided, the step of entering the code may comprise exposing the barcode to a means capable of reading barcodes. Alternatively the code may comprise a numerical and/or an alphabetical code which can be deciphered by a person and entered manually in whole or in part by hand into the means for accessing the set of digital information from the first computer readable means capable of storing digital information. Computer 46 then retrieves the digital image from the storage means in step 120 and enables printer 36 to print a second hardcopy in step 122. Prior to printing the second hardcopy, the digital image may be displayed on monitor 38 to verify that the correct image has been retrieved.

If the second computer is electronically separated from the self-photography booth in that it cannot interface directly with the computer of the self-photography booth, the digital images must be saved at some point on a storage device capable of being physically removed from computer 12. For example, a digital image may be saved on a zip drive at self-photography booth 10. The zip drive may then be removed and transferred to a central computer system, such as computer 46, located remote from the self-photography booth. The digital information saved on the zip drive could be downloaded into computer 46's hard drive or transferred to a more appropriate long-term storage means.

The user of the self-photography booth could then order additional photos or a catalog of alternative products by calling the telephone number address, printed on the photograph produced at the self-photography booth, and reading aloud the code printed on the photograph to a customer service representative capable of accessing the user's photographic image from the central computer system. The ordered photographs and/or catalog are then printed in step 122 as described above, and shipped to the user. Alternatively, the user could access a website according to an appropriate e-mail address printed on the photograph produced at the self-photography booth and entering the code into a computer terminal.

Figure 5A:
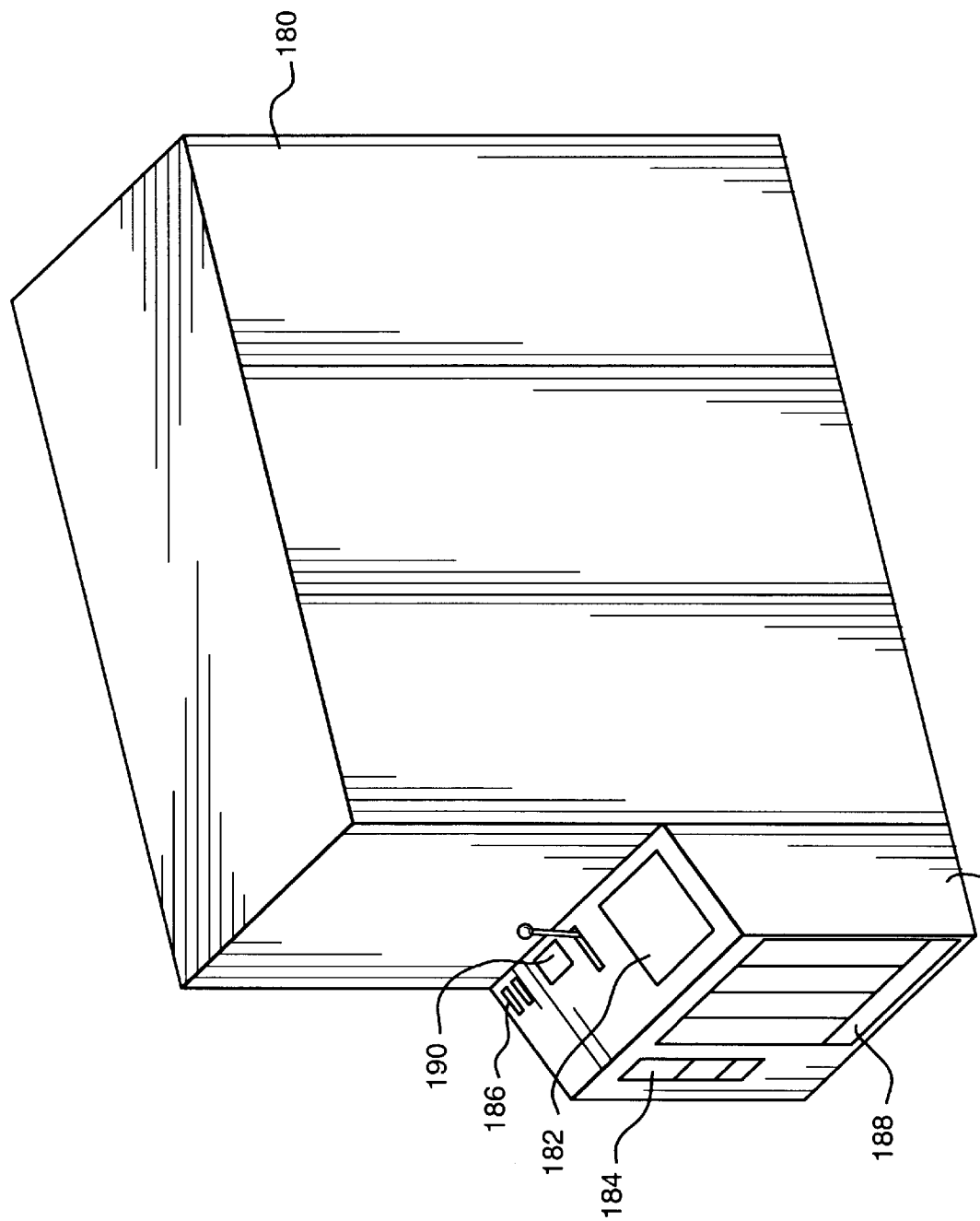
FIG. 5A is a perspective view of a self-photography booth and vending machine for accomplishing another preferred embodiment of the invention.
Figure 5B:
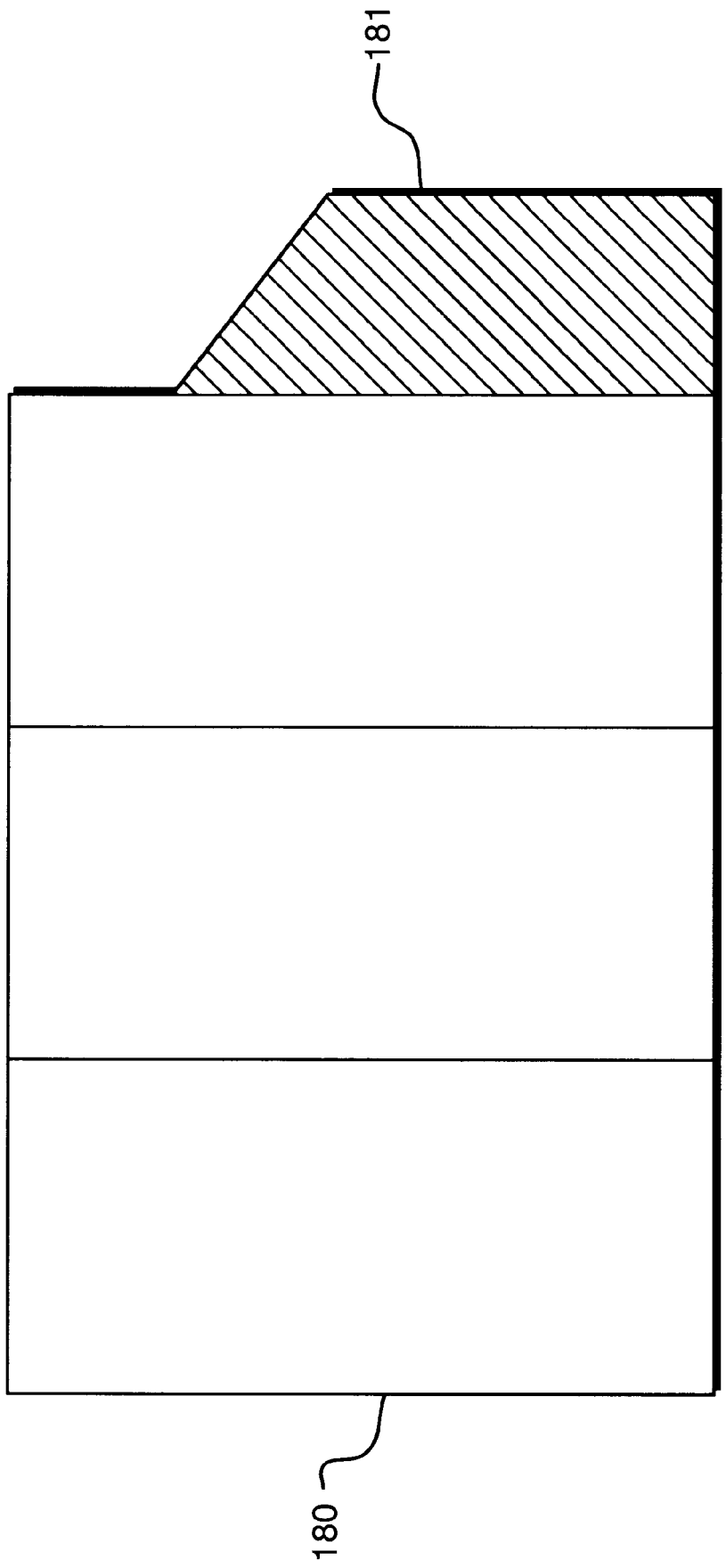
FIG. 5B is a sideview of the self-photography booth and vending machine shown in FIG. 5A.

The second computer may also be configured to interface directly with the self-photography booth. For example, the second computer, although remotely located from the self-photography booth may interface with the computer of the self-photography booth through a modem or laplink. Other possible embodiments of a self-photography booth and a second computer configured to interface directly with the self-photography booth are shown in FIGS. 5, 5A and 5B. If the invention is carried out using a self-photography booth such as system 10 in which computer 46 configured to interface directly with computer 12, then the method of the invention would not need to include step 114 for removing the computer readable means. Rather the digital data could be directly and electronically transferred from computer 12 to computer 46.

Figure 4:
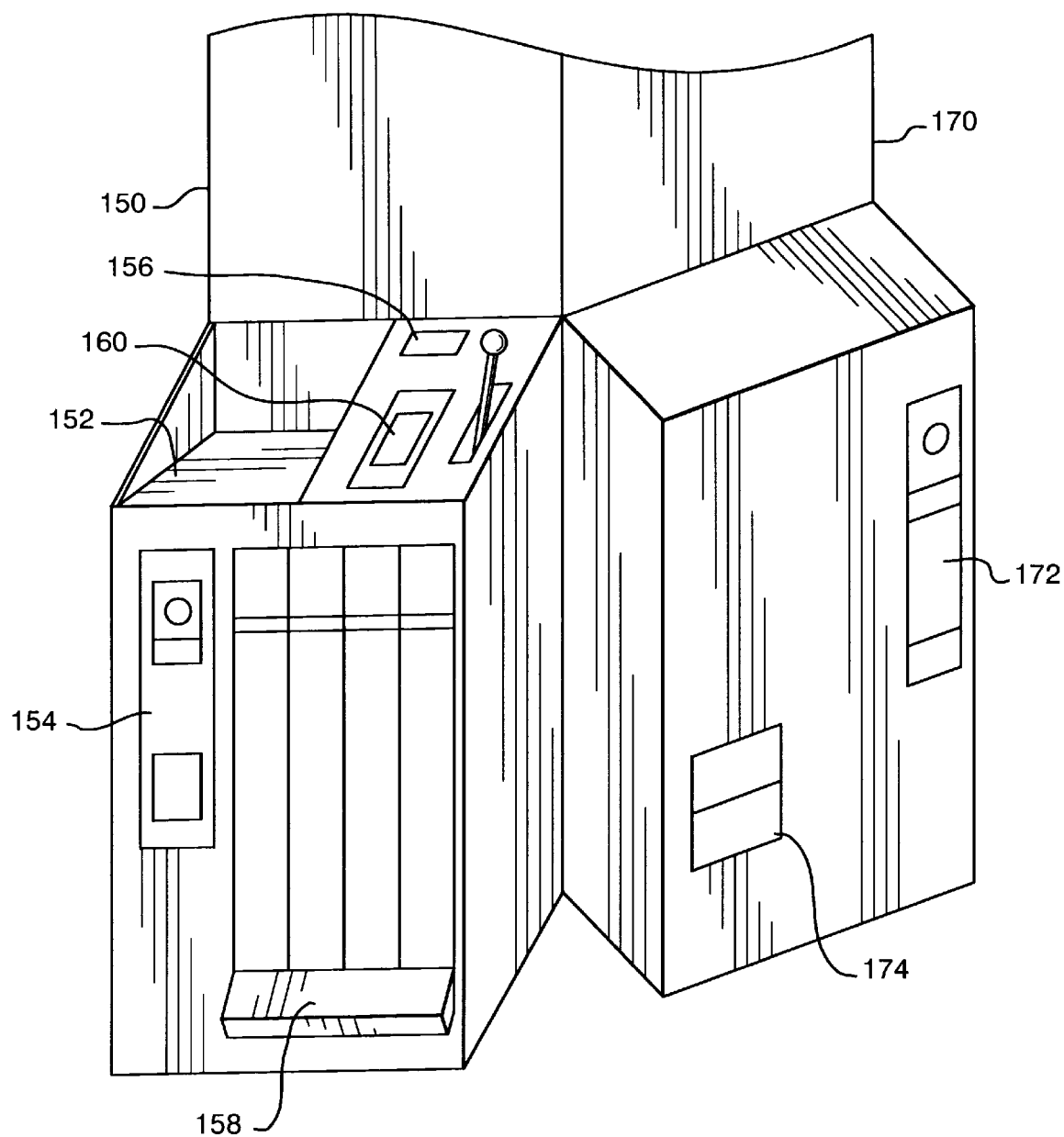
FIG. 4 is a perspective view of a self-photography booth and vending machine for accomplishing a preferred embodiment of the invention.
Figure 6A:
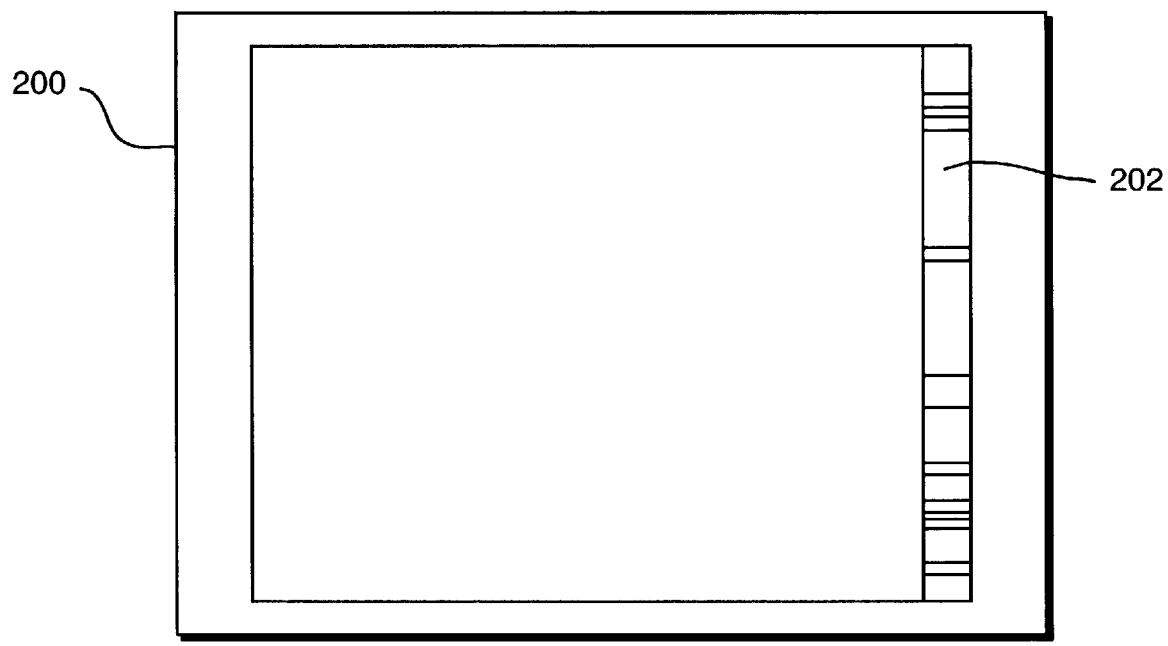
FIG. 6A is a top view of an embodiment of the photographic image produced by and for further use with the method of a preferred embodiment of the invention.

FIG. 4 illustrates self-photography booth 170 includes bill acceptor 172 and photo chute 174. The photograph produced by booth 170 preferably takes the form of photograph 200 having barcode 202 printed thereon as shown in FIG. 6A. The user may then take photograph 200 around to the front of vending machine 150, which is configured to interface directly and electronically with booth 170. In response to instructions displayed on screen 152, the user has the option to insert the appropriate amount of money in bill acceptor 154 and expose the barcode printed on the face of photograph 200 to barcode sensor 156 provided at vending machine 150. Vending machine 150 may include a monitor capable of displaying the user's accessed digital image to assure the user that the correct image has been accessed prior to purchasing an alternative print format. Vending machine 150 may be configured to produced a variety of alternative print formats of the user's image including stickers, key chains, magnets and framed prints as illustrated in FIG. 4. Based on the user's choice, the alternative print format is delivered at vending machine 150 by dispenser 158. Key chain stamp 160 may also be provided at vending machine 150.

Figure 7A:
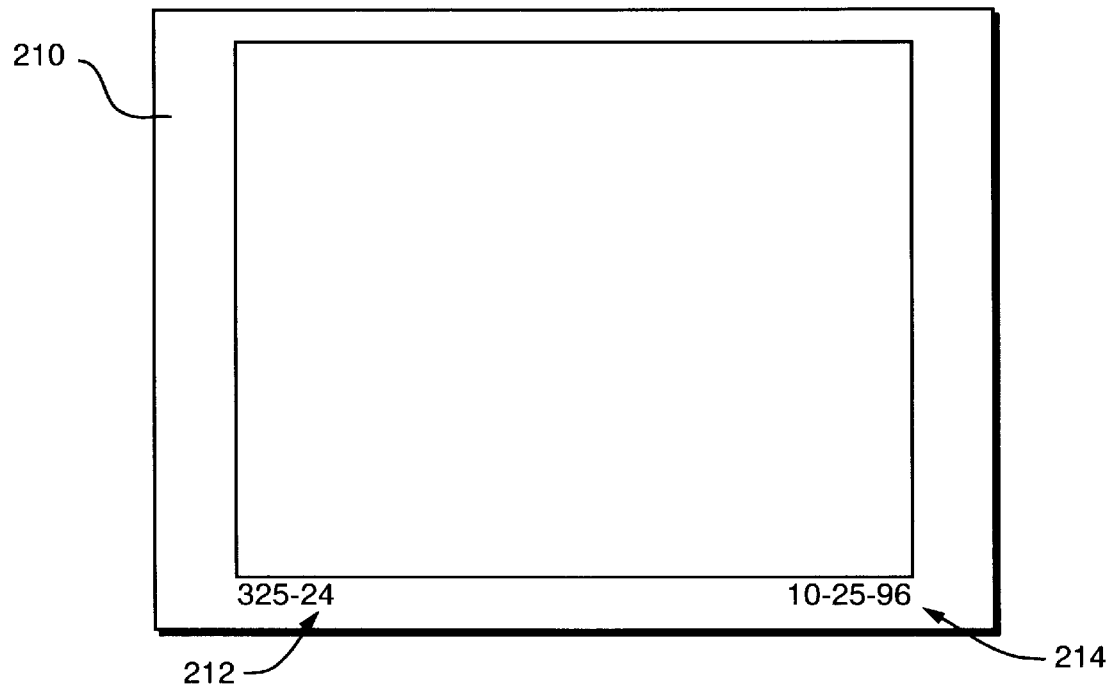
FIG. 7A is a top view of another embodiment of the photographic image produced by and for further use with the method of another preferred embodiment of the invention.
Figure 7B:
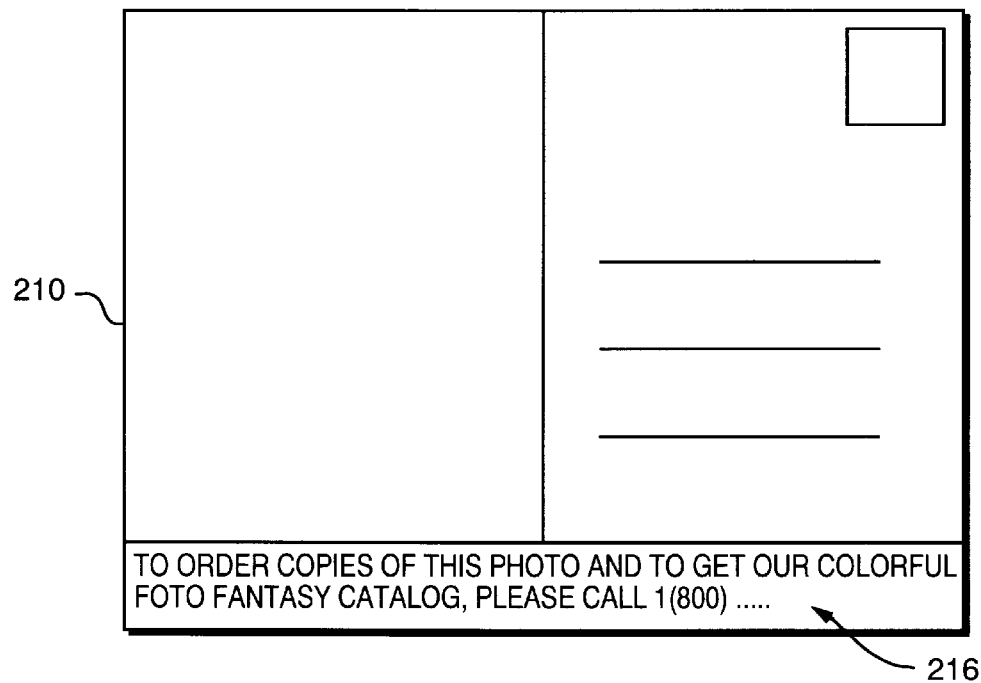
FIG. 7B is a bottom view of the photograph shown in FIG. 7A.

The photograph delivered to the user at booth 170 may also take the form of photograph 210 shown in FIGS. 7A and 7B. Photograph 210 has two numerical codes printed on the front thereof. Code 212 indicates the self-photography booth number and the number assigned to photograph 210. Code 214 indicates the date on which photograph 210 was taken by booth 170. If the photograph delivered to the user at booth 170 is configured with the numerical codes shown on photograph 210, then vending machine 150 should also be provided with a key pad (not shown) for punching the appropriate code into the key pad.

Figure 6B:
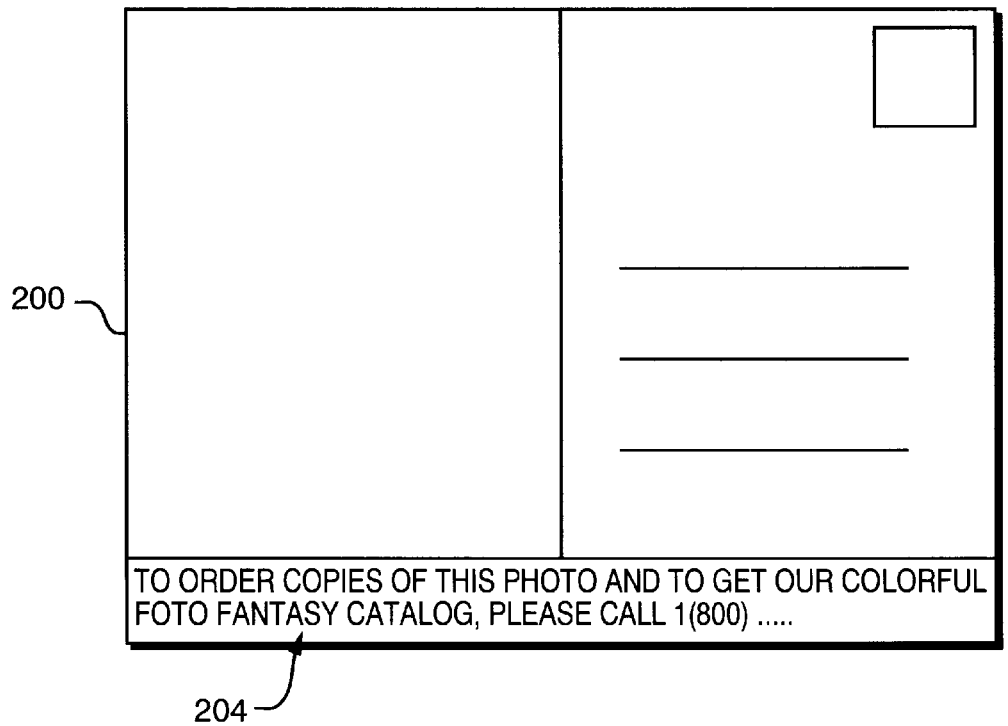
FIG. 6B is a bottom view of the photograph shown in FIG. 6A.

FIGS. 6B and 7B show the backs of photographs 200 and 210 respectively having alternative ordering instructions 204 and 216 printed thereon. The contents of the ordering instructions will depend on the ordering methods or options available as described above.

FIGS. 5A and 5B show another preferred embodiment of a self-photography booth and a second computer or vending machine configured to interface directly with the self-photography booth. Vending machine 181 is configured to interface with self-photography booth 180. After purchasing an initial photograph, similar to photographs 200 or 210 shown in FIGS. 6A and 7A respectively, the user may take the photograph around to vending machine 181 and in response to instructions displayed on screen 182, insert money into bill acceptor 184 and either expose a barcode, if provided, to barcode sensor 186, or punch a numerical code into a key pad (not shown). The user's retrieved digitized image may then be displayed on screen 182 or on a separate monitor (not shown). After the desired alternative print format is chosen by the user, vending machine 181 delivers the print to the user through dispenser 188. Similar to vending machine 150 shown in FIG. 4, vending machine 181 may be provided with a key chain stamp 190. FIG. 5B shows self-photography booth 180 and vending machine 181 from the side. Vending machine 181 may be configured to interface directly with self-photography booth 180 through a laplink or be used as a stand alone vending machine. In the latter case, the digital photographs taken at booth 180 must be saved on a zip drive or diskette and transferred to vending machine 181.

Figure 3:
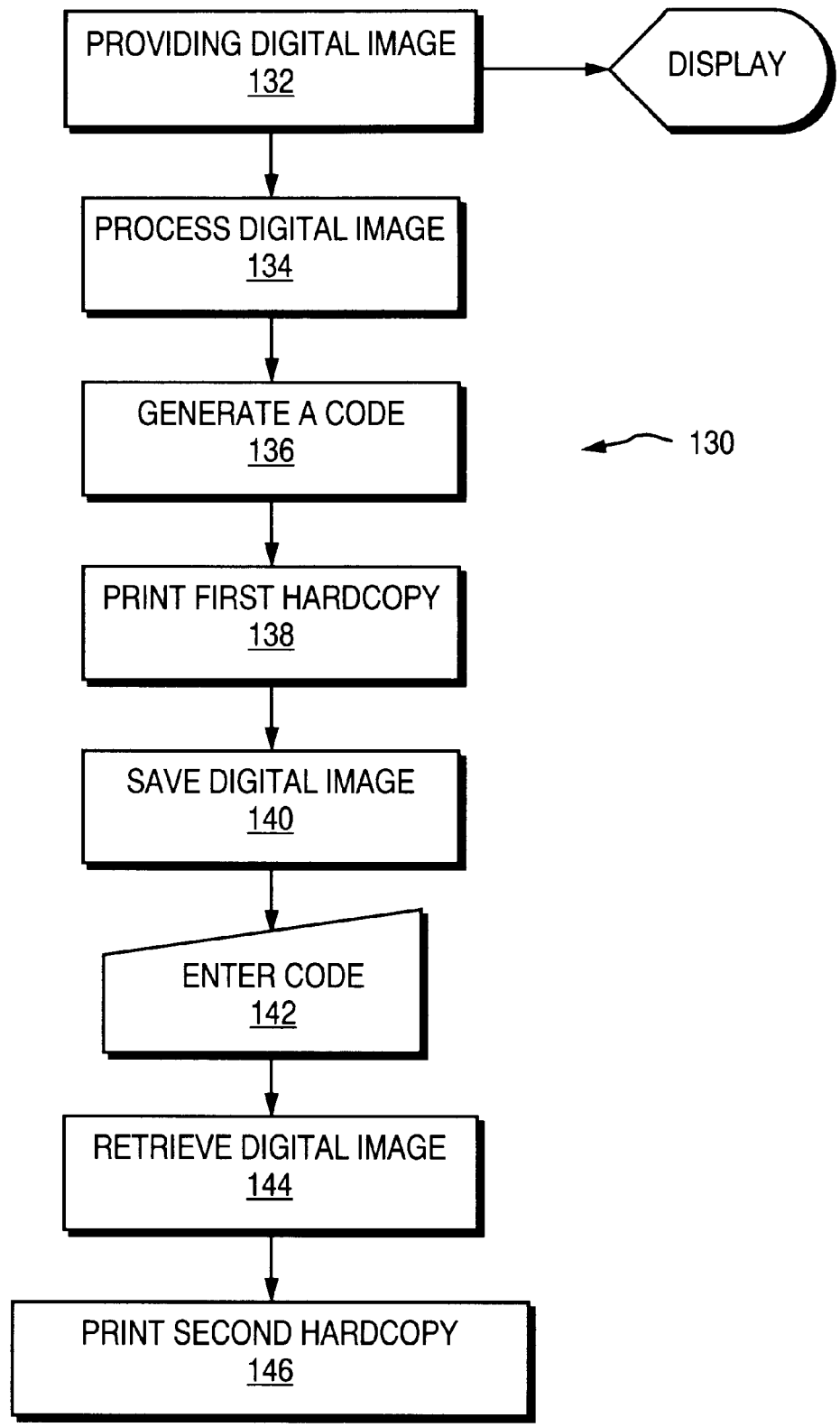
FIG. 3 is a flow chart of a second preferred embodiment of the invention.

A flow chart of another preferred method according to this invention is shown in FIG. 3. This method is intended for use with a self-contained self-photography booth/vending machine configured to print additional prints or alternative print formats without transferring the digital images to a second vending machine or central computer system. Steps 132, 134, 136, 138 and 140 are substantially the same as steps 104, 106, 108, 110 and 112 of method 102 shown in FIG. 2 and described above. However, although steps 142, 144 and 146 of method 130 are substantially the same as steps 118, 120 and 122 of method 102, steps 142, 144 and 146 are carried out at the self-phogtraphy booth rather than at a separate vending machine or remotely located central computer system. As such, method 130 does not include removal step 114 and transfer step 116, both shown in FIG. 2 and described above.

If the user of the self-contained self-photography booth so chooses after purchasing and receiving the first photograph, the user may purchase additional prints or alternative print formats such as a keychain, magnet or stickers at the same machine by simply inserting additional money into a bill acceptor and choosing the desired print format. Options and instructions may be displayed on the face of the booth or on a monitor screen.

In accordance with the instructions, the user of the self-contained booth then electronically or manually enters, in step 142, the barcode or numerical code appearing on the face of the photograph previously received. After the saved image is retrieved in step 144 by the computer provided in the self-contained booth, the alternative print format of the photograph, chosen by the user, is printed in step 146. These second print formats may be immediately retrieved, printed and delivered to the user while the user is at the booth or retrieved, printed and mailed to the user at a subsequent time.

Although specific features of this invention are shown in some drawings and not others, this is for convenience only as some feature may be combined with any or all of the other features in accordance with the invention.

Other embodiments will occur to those skilled in the art and are within the following claims.

What is claimed is:

1. A method for saving, accessing and reprinting a digitized photographic image, comprising the steps of:

providing a self-photography booth capable of fixing said digitized image;

one or more means for activating said booth;

fixing said digitized image in response to said means for activating said booth;

automatically generating a code corresponding to said digitized photographic image, in response to said fixing step;

printing a first hard copy of said digitized photographic image so that said code appears on said first hard copy;

saving said digitized photographic image as a set of digital information under said code onto a first computer readable means capable of storing digital information;

accessing said digitized photographic image comprising the steps of:

entering said code, as it appears on said hard copy, into a means for accessing said set of digital information from said first computer readable means capable of storing digital information;

retrieving said saved digitized photographic image; and printing a second hard copy of said digitized photographic image.

2. The method for saving, accessing and reprinting a digitized photographic image of claim 1, wherein said code comprises a barcode and in which the step of entering said code comprises exposing said barcode to a means for reading barcodes.

3. The method for saving, accessing and reprinting a digitized photographic image of claim 1, further including the step of:

transferring said set of digital information to said means for accessing said set of digital information from said first computer readable means.

4. The method for saving, accessing and reprinting a digitized photographic image of claim 3, in which the transferring step further comprises the step of:

removing said first computer readable means for storing to a remote location.

5. The method for saving, accessing and reprinting a digitized photographic image of claim 4, in which said step of transferring takes place after said saving step and before said accessing step.

6. The method for saving, accessing and reprinting a digitized photographic image of claim 4, wherein said first computer readable means capable of storing digital information is a portable storage media.

7. The method for saving, accessing and reprinting a digitized photographic image of claim 3, wherein said means for accessing said set of digital information from said first computer readable means capable of storing digital information is electronically remote from said means capable of processing digital information.

8. The method for saving, accessing and reprinting a digitized photographic image of claim 3, wherein said transferring step comprises the step of electronically interfacing said means capable of processing digital information directly with said means for accessing said set of digital information.

9. The method for saving, accessing and reprinting a digitized photographic image of claim 8, wherein said interfacing step is accomplished using an analog line.

10. The method for saving, accessing and reprinting a digitized photographic image of claim 8, wherein said interfacing step is accomplished using a digital line.

11. A method for saving, accessing and reprinting a digitized photographic image, comprising the steps of:

providing a self-photography booth capable of fixing said digitized image;

one or more means for activating said booth;

fixing said digitized image in response to said means for activating said booth;

automatically generating a code corresponding to said digitized photographic image, in response to said fixing step;

printing a first hard copy of said digital photographic image so that said code appears on said first hard copy;

saving said digitized photographic image as a set of digital information under said code onto a first computer readable means capable of storing digital information;

removing said first computer readable means for storing to a remote location;

transferring said set of digital information to a second computer readable means capable of storing digital information; and accessing said digitized photographic image comprising the steps of:

entering said code, as it appears on said hard copy, into a means for accessing said set of digital information from said second computer readable means capable of storing digital information, wherein said means for accessing said set of digital information is remote from a means capable of processing digital information;

retrieving said saved digitized photographic image; and printing a second hard copy of said digitized photographic image.

12. The method for saving, accessing and reprinting a digitized photographic image of claim 11, wherein said first computer readable means capable of storing digital information is a portable storage media.

13. The method for saving, accessing and reprinting a digitized photographic image of claim 11, wherein said portable storage media is a diskette.

14. The method for saving, accessing and reprinting a digitized photographic image of claim 1 further including a step of delivering said first hard copy of said digitized photographic image to said user contemporaneously with said code.

15. The method for saving, accessing and reprinting a digitized photographic image of claim 14 wherein said delivering step includes printing said code on a receipt and delivering said receipt to said user.

16. The method for saving, accessing and reprinting a digitized photographic image of claim 14 wherein said delivering step includes displaying said code at said photography booth.

* * * * *